United States Patent
Kaplan et al.

(10) Patent No.: US 9,195,809 B1
(45) Date of Patent: Nov. 24, 2015

(54) AUTOMATED VULNERABILITY AND ERROR SCANNER FOR MOBILE APPLICATIONS

(71) Applicant: SYNACK, INC., Menlo Park, CA (US)

(72) Inventors: Jay Kaplan, Palo Alto, CA (US); Mark Kuhr, Los Altos, CA (US); Patrick Wardle, Maui, HI (US)

(73) Assignee: SYNACK, INC., Menlo Park, CA (US)

( * ) Notice: Subject to any disclaimer, the term of this patent is extended or adjusted under 35 U.S.C. 154(b) by 0 days.

(21) Appl. No.: 14/460,069

(22) Filed: Aug. 14, 2014

(51) Int. Cl.
*G06F 21/12* (2013.01)
*G06F 21/62* (2013.01)
*G06F 21/10* (2013.01)

(52) U.S. Cl.
CPC .......... *G06F 21/121* (2013.01); *G06F 21/6218* (2013.01); *G06F 2221/2107* (2013.01)

(58) Field of Classification Search
CPC ......... G06F 21/00; G06F 21/10; G06F 21/12; G06F 21/121; G06F 21/125; G06F 21/50; G06F 21/52; G06F 21/53; G06F 21/54; G06F 21/60; G06F 21/606; G06F 21/62; G06F 21/6218; G06F 21/6245; G06F 2221/2107
See application file for complete search history.

(56) References Cited

U.S. PATENT DOCUMENTS

| | | | |
|---|---|---|---|
| 2003/0131285 A1* | 7/2003 | Beardsley et al. | 714/38 |
| 2005/0039022 A1* | 2/2005 | Venkatesan et al. | 713/176 |
| 2008/0189550 A1* | 8/2008 | Roundtree | 713/176 |
| 2008/0209567 A1* | 8/2008 | Lockhart et al. | 726/25 |
| 2009/0138853 A1* | 5/2009 | Orrick | 717/124 |
| 2009/0158260 A1* | 6/2009 | Moon et al. | 717/133 |
| 2009/0282474 A1* | 11/2009 | Chen et al. | 726/21 |
| 2010/0275026 A1* | 10/2010 | McLean | 713/176 |
| 2011/0035601 A1* | 2/2011 | Davidson et al. | 713/190 |
| 2011/0119765 A1* | 5/2011 | Hering et al. | 726/25 |
| 2012/0246484 A1* | 9/2012 | Blaisdell et al. | 713/189 |
| 2012/0266157 A1* | 10/2012 | Mun et al. | 717/174 |
| 2013/0097659 A1* | 4/2013 | Das et al. | 726/1 |
| 2013/0179865 A1* | 7/2013 | Neumeyer et al. | 717/127 |
| 2013/0347094 A1* | 12/2013 | Bettini et al. | 726/11 |
| 2015/0081598 A1* | 3/2015 | Depizzol et al. | 706/12 |

* cited by examiner

*Primary Examiner* — Darren B Schwartz
(74) *Attorney, Agent, or Firm* — Hickman Palermo Becker Bingham LLP

(57) ABSTRACT

In an embodiment, a method comprises downloading an application program to a first storage coupled to a first device, wherein the application program comprises an encrypted portion based on a set of personally identifying data stored on the first storage; configuring the application program to load and execute a pre-compiled library when the application program is launched and which when executed by the first device, causes storing an unencrypted version of the application program on the first storage; launching the application program.

8 Claims, 5 Drawing Sheets

AUTOMATED VULNERABILITY AND ERROR SCANNER FOR MOBILE APPLICATIONS

FIELD OF THE DISCLOSURE

The present disclosure generally relates to security techniques applicable to embedded computer systems, and relates more specifically to improved techniques for detecting vulnerabilities and errors in applications running on embedded computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Embedded computing devices, such as smart phones and tablet computers, may be used to perform one or more specialized and/or dedicated functions. An embedded device may include components not normally provided on typical desktop computers, such as cellular radio modems, motion sensors, cameras, lights, global positioning system receivers, and other inputs. Embedded devices often include specialized hardware configurations. For example, a smart phone may include a processor that is optimized to minimize power consumption, which may allow the phone to operate longer before needing to be recharged. Embedded devices that have a built-in display may include specialized hardware configured to provide a higher refresh rate for the particular built-in display.

Applications that run on embedded devices may be specialized based on the target embedded device(s). For example, source code and content for a particular application or project may be compiled and packaged to produce a first specialized application configured to be executed on a first embedded device with a first set of hardware. The same source code and content may be compiled and packaged again to produce a second, different specialized application configured to be executed on a second embedded device with a second, different set of hardware.

Many users carry at least one embedded device to communicate with customers, schedule meetings, pay bills, trade stocks, track expenses, book flights and hotels, read articles, view multimedia content, listen to music, play games, purchase goods and services, track diet and fitness, browse web sites, draft documents, make phone calls, and much more using many different applications. As a result, users frequently input, download, and store sensitive information, such as usernames, passwords, social security numbers, home or work addresses, medical information, customer information, documents, contact information, photos, and other private and sensitive data.

Determining what vulnerabilities an application or project has is useful to protect application users and developers. However, determining what vulnerabilities an application has may be difficult and time consuming. Furthermore, a single application or project may be compiled into multiple specialized applications, each of which may have different vulnerabilities.

SUMMARY

The appended claims may serve as a summary of the invention.

Figure 1:
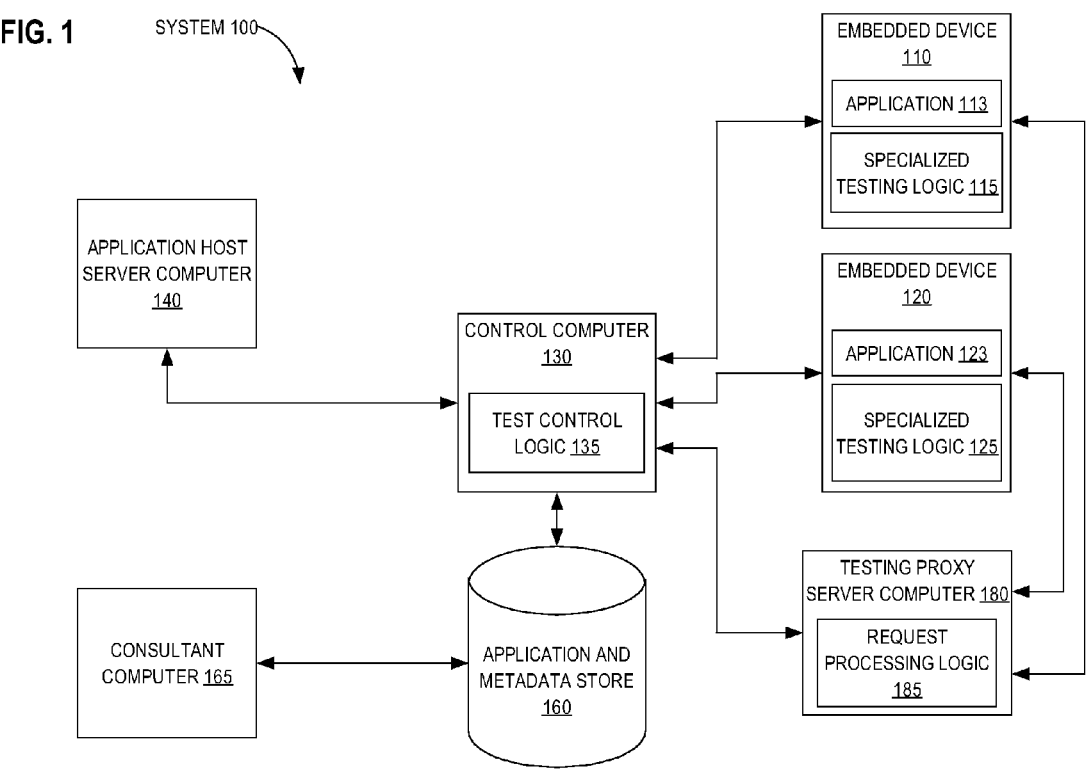
FIG. 1 illustrates a computer system for detecting vulnerabilities and errors in one or more specialized applications for one or more embedded devices in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Protecting Embedded Application Users and Developers
3.0 Example Computer System Topology
   3.1 Application Host Server Computer
   3.2 Embedded Devices
   3.3 Control Computer
   3.4 Storages
   3.5 Consultant Computer
4.0 Process Overview
   4.1 Downloading a Specialized Application
   4.2 Configuring the Application to Load and Execute Testing Logic
   4.3 Executing the Application
   4.4 Extracting Disassembly and Metadata
      4.4.1 Decrypting the Application
      4.4.2 Storing the Unencrypted Version of Application
      4.4.3 Generating and Storing Disassembly
      4.4.4 Extracting Descriptions of Objects and Interfaces
      4.4.5 Sending the Unencrypted Application, Disassembly, and Metadata to a Consultant
   4.5 Testing for Vulnerabilities and Errors
      4.5.1 Selecting a UI Element that is Currently Presented
      4.5.2 Simulating one or more User Inputs by Entering one or more Values in one or more UI Input Elements 4.5.3 Detecting one or more Vulnerabilities and/or Errors
    4.5.3.1 Detecting Unencrypted User Input Stored in one or more Files
    4.5.3.2 Detecting User Input in Unencrypted Communication
    4.5.3.3 Detecting Early Termination of the Application
    4.5.3.4 Detecting A Mixed Content Vulnerability
    4.5.3.5 Detecting False Certificates
    4.5.3.6 Detecting Data and/or Content in the Unencrypted Application
    4.5.3.7 Supplementing Records of Vulnerabilities and/or Errors
4.6 Testing Multiple Applications and/or Versions
5.0 Implementation Mechanisms—Hardware Overview
6.0 Other Aspects of Disclosure
1.0 General Overview In an embodiment, a computer system comprises A computer system comprising: a first device comprising a first memory, a first processor coupled to the first memory, a first processing logic coupled to the first memory and the first processor; a second device comprising a second memory, a second processor coupled to the second memory, a second processing logic coupled to the second memory and the second processor, and configured to: download an application program to the first memory, wherein the application program comprises an encrypted portion that is based on a set of personally identifying data stored in the first memory; configure the application program to load the first processing logic when the application program is executed, wherein the first processing logic is configured to store an unencrypted version of the application program on the first memory while the application program is being executed; cause the first device to execute the application program.

In an embodiment, a data processing method comprises downloading an application program to a first storage coupled to a first device, wherein the application program comprises an encrypted portion based on a set of personally identifying data stored on the first storage; configuring the application program to load and execute a pre-compiled library when the application program is launched and which when executed by the first device, causes storing an unencrypted version of the application program on the first storage; launching the application program.

In an embodiment, the application program is compiled for the first device with a first architecture and downloading the application program comprises: storing the application program on a second storage coupled with a second device with a second architecture, wherein the first architecture and the second architecture are different; copying the application program from the second storage to the first storage.

In an embodiment, the data processing method comprises extracting a description of one or more objects defined in the unencrypted version of the application program; generating a disassembled version of the unencrypted version of the application program.

In an embodiment, the data processing method comprises determining a first input view is currently presented on a display coupled to the first device; determining the first input view is a first type of input; entering one or more values in the first input view; determining one or more file I/O events occurred; associating the one or more file I/O events with the one or more values and the first input view; determining the one or more values are stored in a file; in response to determining the one or more values are stored in the file, associating a vulnerability flag with the first input view indicating the one or more values may be vulnerable to a particular malicious attack based on reading unencrypted data from files.

2.0 Protecting Embedded Application Users and Developers

Because embedded devices, such as smart phones and tablet computers, are popular, attackers may target a specific specialized application on an embedded device to access sensitive information stored on, or entered into, the embedded device. For example, an attacker may employ a man-in-the-middle attack to collect login information entered by a user into a vulnerable specialized banking application on her phone and sent to her bank. The attacker may then access the user's bank account and transfer funds. An attacker may look for usernames and passwords saved in an unencrypted file generated by a specialized application. An attacker may inject code downloaded by a specialized application to cause the specialized application to perform one or more operations that the user did not intend, such as delete data, send data to the attacker, and impersonate the user.

Attackers may target a specific specialized application on an embedded device to disrupt services, attack the application's developer(s), and users on other devices. For example, an application developer may create a specialized application that sends data to a particular web server identified by an unprotected Internet Protocol ("IP") address or Uniform Resource Locator ("URL"). An attacker may extract the unprotected URL from the specialized application, and perform a denial of service attack on the web server. Also for example, an application developer may create a specialized application that stores data in, or receives data from, an online database through an Application Program Interface ("API"). An attacker may analyze the specialized application to find unprotected API credentials used to send data to, and retrieve data from, the online database. The attacker may use the API credentials to retrieve private data from the online database for one or more users and/or store bogus data in the online database.

Detecting vulnerabilities and errors in an application or project is useful to protect application users and developers. However, detecting what vulnerabilities an application has may be difficult and time consuming. Furthermore, a single application or project may be compiled into multiple specialized applications, each of which may have different vulnerabilities.

3.0 Example Computer System for Detecting Vulnerabilities and Errors

FIG. 1 illustrates a computer system for detecting vulnerabilities and errors in one or more specialized applications for one or more embedded devices in an example embodiment. An application, logic, and/or module may be specialized if it is configured to be executed on an embedded device with a particular hardware and/or software configuration. In FIG. 1, system 100 includes embedded device 110, embedded device 120, control computer 130, application host server computer 140, vulnerability data store 150, application and metadata store 160, consultant computer 165, and testing proxy server computer 180 communicatively coupled over one or more computer networks.

A computer may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

While each of the components listed above is illustrated as if running on a separate, remote computer from each other, one or more of the components listed above may be part of and/or executed on the same computer. For example, control computer 130, application host server computer 140, application and metadata store 160, consultant computer 165, and testing proxy server computer 180 may be executed on the same computer, local area, and/or wide area network.

3.1 Application Host Server Computer

Application host server computer 140 may generate and/or store one or more specialized applications, from which one or more computers and/or devices may download applications from. For example, application host server computer 140 may receive a request for a particular application from a first embedded device using a particular user's credentials. In response, application host server computer 140 may send a specialized version of the application to the first embedded device. The specialized version may be a particular version of the application that is configured to be executed on the first embedded device. The specialized version of the application, or one or more portions the specialized version, may be encrypted based on the particular user's credentials. Accordingly, computers that do not have the particular user's credentials may be prevented from decrypting and/or using the specialized version.

3.2 Embedded Devices

Embedded device 110 and embedded device 120 may be embedded devices with different hardware and/or software configurations. Each embedded device may comprise one or more processors and/or memory. For example, embedded device 110 may be a smart phone and comprise a first set of hardware, and embedded device 120 may be a tablet and comprise a second, different set of hardware. Additionally or alternatively, embedded device 110 may comprise a first operating system and embedded device 120 may comprise a second, different operating system. Embedded device 110 and embedded device 120 may be communicatively coupled to control computer 130 wirelessly and/or through one or more cables and/or networks.

Embedded device 110 may comprise application 113, which may be a specialized version of a particular application downloaded from application host server computer 140, which embedded device 110 may execute. "Executing" an application, process, and/or any other module or logic may include launching, loading, spawning, interpreting, and/or executing the application, process, and/or any other module or logic. Embedded device 120 may comprise application 123, which may be a different specialized version of the same particular application downloaded from an application host server computer, such as different application host server computer 140.

Additionally or alternatively, a specialized application may be a "universal application", which includes multiple executable modules and/or files. Each of the multiple executable modules and/or files may be configured to be executed by one or more particular hardware and/or software configurations. When the embedded device executes the application, the embedded device, and/or logic on the embedded device, may determine which modules and/or files are configured for that particular embedded device, and execute those modules and/or or files.

Embedded device 110 comprises specialized testing logic 115. Specialized testing logic 115 may be specialized hardware and/or software for embedded device 110 and/or application 113. Specialized testing logic 115 may be executed by embedded device 110 and/or an application running on embedded device 110, such as an operating system or application 113. For example, specialized testing logic 115 may be a pre-compiled, shared, and/or dynamically linked library specialized for the hardware and/or software configuration of embedded device 110. Application 113 may, at run-time, may load specialized testing logic 115 and cause one or more methods in specialized testing logic 115 to be executed.

Specialized testing logic 115 may be executed as if part of application 113. Specialized testing logic 115 may be executed in parallel with application 113. Specialized testing logic 115 may have access to the memory, hardware, modules, and/or other resources on embedded device 110 and/or in application 113, as if part of application 113. Specialized testing logic 115 may execute in parallel with application 113 on embedded device 110. Specialized testing logic 115 may be communicatively coupled with control computer 130 and/or test control logic 135. Specialized testing logic 115 may be created by a first entity, such as a testing facility, and application 113 may be created by a second, different entity, such as an application developer.

Embedded device 120 comprises specialized testing logic 125. Specialized testing logic 115 may be specialized hardware and/or software for embedded device 120 and/or application 123. Specialized testing logic 125 may be executed by embedded device 120 and/or an application running on embedded device 120, such as an operating system or application 123. While specialized testing logic 125 may have one or more of the same behaviors and features as specialized testing logic 115, specialized testing logic 125 may be exclusively specialized for embedded device 120 and/or application 123, and may not be executable and/or interpretable by embedded device 110 and/or application 113.

3.3 Control Computer

Control computer 130 may be a computer communicatively coupled to embedded device 110, embedded device 120, application host server computer 140, application and metadata store 160, and testing proxy server computer 180. Control computer 130 may store and/or receive data from each device directly or through one or more other devices.

Control computer 130 comprises test control logic 135, which may coordinate testing between a specialized application on an embedded device, a specialized testing logic on the same embedded device, and one or more other computers, logic, or server computers, such as testing proxy server or consultant computer 165. Test control logic 135 may store one or more applications and/or one or more specialized testing modules and/or logic on an embedded device. For example, test control logic 135 may store application 113 and specialized testing logic 115 in storage included in, and/or communicatively coupled to, embedded device 110. Test control logic 135 may store one or more applications, metadata derived from the one or more applications, and/or data describing one or more vulnerabilities and/or errors detected in the one or more applications in application and metadata store 160.

Figure 5:
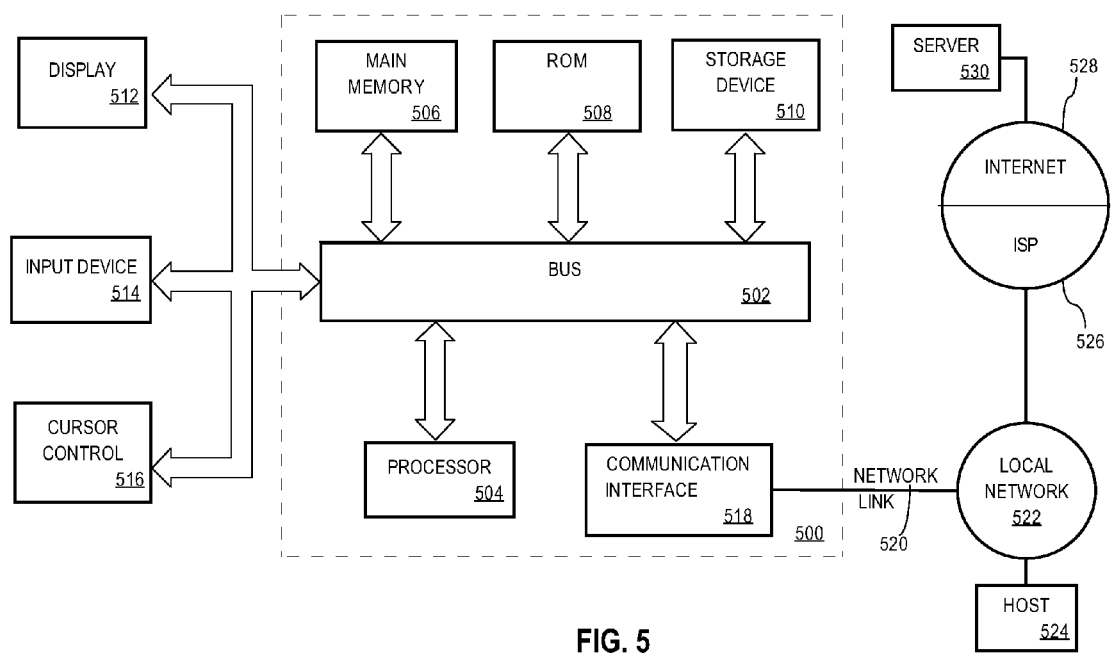
FIG. 5 illustrates a computer system upon which an embodiment may be implemented.

In an embodiment, each of the functional units of control computer 130 may be implemented using any of the techniques further described herein in connection with FIG. 5; for example, the control computer 130 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

3.4 Testing Proxy Server Computer

Testing proxy server computer 180 may be a computer that is communicatively coupled with one or more embedded devices, control computers, and/or external network. For example, testing proxy server computer 180 may be communicatively coupled to embedded device 110, embedded device 120, control computer 130, and the Internet.

Testing proxy server computer 180 may comprise request processing logic 185, which intercepts and/or processes data sent from and/or to one or more embedded devices. Request processing logic 185 may test and/or detect one or more vulnerabilities in one or more applications on one or more embedded devices in concert with specialized test control logic 135. Request processing logic 185 may report vulnerabilities to test control logic 135. Request processing logic 185 may store vulnerabilities related to one or more applications on one or more embedded devices to vulnerability data store 150.

3.5 Storage and Memory

A data store and/or storage may be one or more databases, configuration files, file systems, computers, and/or data structures that store data in volatile and/or non-volatile memory.

Storage, data stores, and/or memory may mean any non-volatile and/or volatile memory components capable of storing data, including electronic digital data storage devices. Application and metadata store 160 may be a data store that stores one or more encrypted applications, decrypted applications, and/or data related to, and/or associated with, the one or more encrypted and/or decrypted applications.

3.6 Consultant Computers

Consultant computer 165 broadly represents any computer that may be used to retrieve and/or store data from application and metadata store 160. The particular role of the user of the computer is not critical and the label "consultant" is used here merely for convenience to illustrate a clear example. A user, such as a computer security consultant, may use consultant computer 165 to retrieve and/or store one or more encrypted applications, decrypted applications, and/or data related to, and/or associated with, the or more applications.

For example, consultant computer 165 may retrieve an encrypted copy of an application, a decrypted copy of the application, and/or metadata describing one or more objects and/or interfaces defined in the application from application and metadata store 160. The consultant may review each of the items downloaded for vulnerabilities and errors and store descriptions of those vulnerabilities and/or errors in application and metadata store 160. The consultant may review and/or validate each of the vulnerabilities and errors and store descriptions of those vulnerabilities and/or errors in application and metadata store 160.

4.0 Process Overview

A control computer may download and store a specialized application on a compatible embedded device. If an application is encrypted, then the control computer may decrypt the application and save a decrypted version in a data store. The control computer may extract metadata from the decrypted application and store the metadata in the metadata in the data store. The control computer may run tests against the application to detect vulnerabilities and/or errors. The control computer store descriptions of the vulnerabilities and errors in the data store. One or more consultants may review, verify, and/or supplement the encrypted version of the application, the decrypted version of the application, the metadata extracted, and/or vulnerabilities and errors found. The control computer and/or a consultant may notify the application's developer(s) and/or vendor(s) of the vulnerabilities and errors found. As a result, embodiments provide numerous benefits and improvements over the general idea of detecting vulnerabilities in a computer. For example, embodiments provide simulating user interaction with one or more encrypted, specialized applications on one or more embedded computing devices. Embodiments provide testing for errors and/or failures in one or more encrypted, specialized applications on one or more embedded computer devices. Embodiments provide detecting vulnerabilities in one or more encrypted, specialized applications on one or more embedded computer devices.

Figure 2:
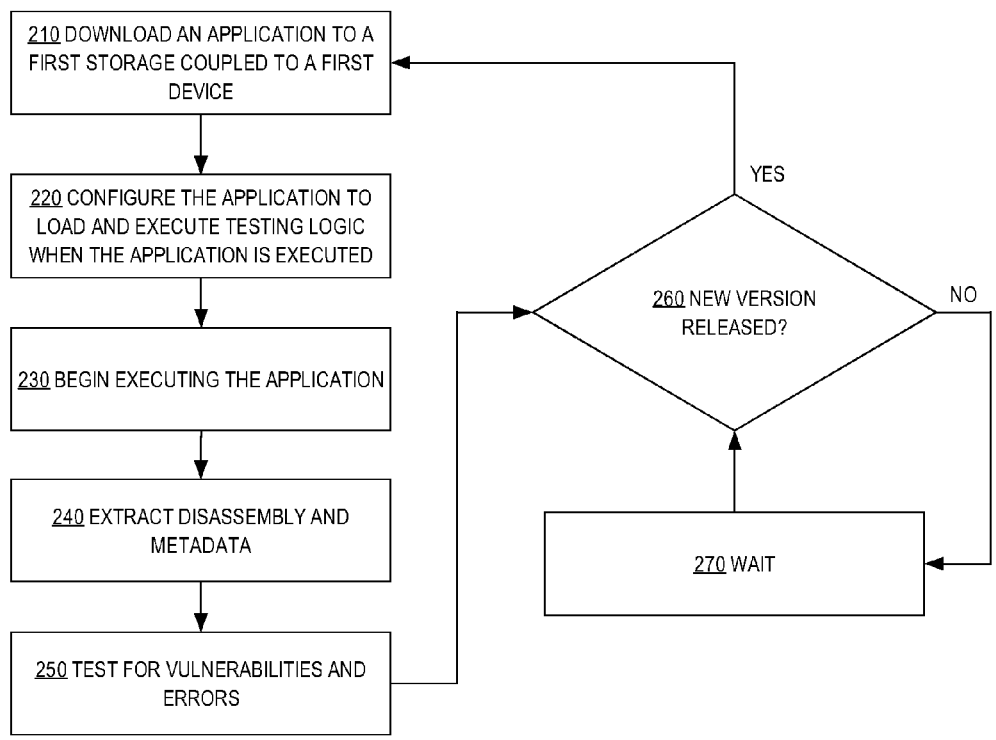
FIG. 2 illustrates a process for downloading and analyzing specialized applications to detect vulnerabilities in an example embodiment.

FIG. 2 illustrates a process for downloading and analyzing specialized applications to detect vulnerabilities in an example embodiment. In an embodiment, an embedded device may have one or more safeguards in place to prevent users from performing one or more of the steps discussed herein. A user may perform one or more steps to get around, skirt, and/or remove such safeguards. Getting around and/or removing safeguards imposed by an embedded device is commonly referred to as "jail breaking", "rooting", and/or "privilege escalation". Although a user has skirted and/or removed one or more safeguards, the embedded device may still be communicatively coupled to control computer 130, application host server computer 140, and/or any other computer.

4.1 Downloading a Specialized Application

In step 210, a control computer downloads an application to a first storage coupled to a first device. For example, test control logic 135 may request a specialized application from application host server computer 140 for embedded device 110. The request may include one or more identifiers that identify embedded device 110. The request may include one or more user credentials associated with the embedded device 110. The request may include one or more identifiers that identify one or more hardware configurations, one or more software configurations, and/or any other data needed to generate, and/or select, a specialized version of an application for embedded device 110.

In response to the request from test control logic 135, application host server computer 140 may encrypt application 113 and send application 113 to test control logic 135. Test control logic 135 may store application 113 on memory included in, and/or coupled to, embedded device 110.

Additionally or alternatively, test control logic 135 may cause embedded device 110 to request specialized application 113 from application host server computer 140. In response, embedded device 110 may receive application 113 from application host server computer 140, and store application 113 on memory included in, and/or coupled to, embedded device 110.

4.2 Configuring the Application to Load and Execute Testing Logic

In step 220, the control computer configures the application to load and execute testing logic when the application is executed. There are many ways to configure an application to load and execute testing logic at run-time. However, for purposes of illustrating a clear example, assume embedded device 110 has a remote command-line interface from which test control logic 135 may modify and/or set system configurations, execute applications, read data from files, write data from files, interface with the operating system, and/or perform, and/or cause embedded device 110 to perform, any other tasks or functions embedded device 110 may be configured to perform. Also assume that application 113 is configured to load one or more libraries identified in a particular environment variable. Test control logic 135 may copy specialized testing logic 115 on embedded device 110. Test control logic 135 may configure embedded device 110 and/or application 113 to load specialized testing logic 115 when application 113 is executed by setting an environment variable that references specialized testing logic 115. Accordingly, when application 113 is executed, then specialized testing logic 115 may be executed.

Additionally or alternatively, application 113 may be pre-configured to load one or more particular libraries when application 113 is executed. Test control logic 135 may replace one of the one or more particular libraries with specialized testing logic 115. Accordingly, when application 113 is executed, then specialized testing logic 115 may be executed.

4.3 Executing the Application

In step 230, the control computer begins executing the application. For example, test control logic 135, through the remote command-line interface, may cause embedded device 110 to begin executing application 113. Accordingly, embedded device 110 may also begin executing specialized testing logic 115.

4.4 Extracting Disassembly and Metadata

Figure 3:
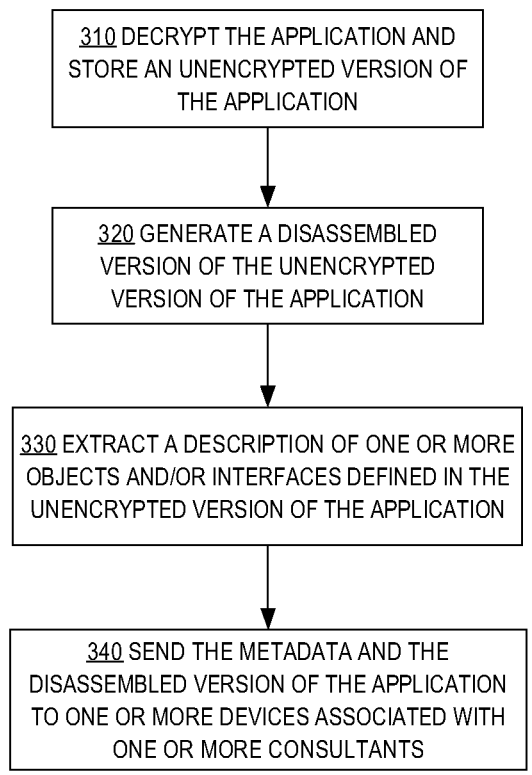
FIG. 3 illustrates a process for decrypting an application, and extracting disassembly and metadata from the application in an example embodiment.

In step 240, the control computer and/or embedded device may extract the disassembly and metadata from the application. FIG. 3 illustrates a process for decrypting an application, and extracting disassembly and metadata from the application in an example embodiment.

4.4.1 Decrypting the Application

An application, or one or more portions of the application, may be encrypted. For convenience of expression, an application is "encrypted" if the entire application is, or one or more portions of the application are, encrypted. A publisher, developer, producer, and/or any other entity may use a computer, such as application host server computer 140, to encrypt an application. The application may be encrypted to prevent unauthorized users from downloading and/or using the application. For example, application host server computer 140 may encrypt application 113 based on the credentials in the request for application 113 in step 210. A user and/or embedded device without the proper credentials may be prevented from decrypting and using the encrypted application. An encrypted application may be encrypted using public/private key encryption, digital rights management technology, and/or any other method.

When an encrypted application is launched on an embedded device with the proper credentials, the embedded device and/or underlying operating system may decrypt the application, and execute the decrypted application. The decrypted application may, however, be stored in memory allocated to the application. The embedded device need not store the decrypted application in persistent storage. Furthermore, the underlying operating system on the embedded device need not allow a separate application and/or process to access the memory allocated to the executing, decrypted application.

A process and/or sub-process of the application may have access to the decrypted version of the application in the memory allocated to the application. However, applications need not include methods that dump the decrypted version of the application to memory and/or storage accessible by a separate device, application, and/or process. To dump a decrypted version of an application, an additional method may be injected into the application and executed at run time. A method may be a function, routine, logic, and/or set of one or more operations.

There are many was to inject a method into an application at run-time. For example, a dynamically linked library may have a method, such as a constructor, that is executed after the dynamically linked library is loaded. The method in the dynamically linked library may be executed as if part of the original application and may have access to the same allocated memory space. The method may be expressly and/or automatically invoked by the application, embedded device, and/or the underlying operating system. The method may be executed serially or in parallel with the application. Additionally or alternatively, a debugger may load the application into memory allocated to the debugger. The debugger may then perform one or more methods as if originally included the application to dump an unencrypted version of the application to memory or storage accessible by other computers and/or applications.

Returning now to FIG. 3, in step 310, the injected method decrypts the application and stores an encrypted version of the application. For purposes of illustrating a clear example, assume the following: Specialized testing logic 115 is a dynamically linked library that application 113 is configured to load when application 113 is executed; and, embedded device 110 and/or the underlying operating system is configured to decrypt application 113 and store the decrypted version in memory allocated to application 113. Accordingly, after embedded device 110 begins executing application 113, embedded device 110 may load and begin executing a constructor defined in specialized testing logic 115. Methods in specialized testing logic 115, such as the constructor, may determine which portion(s) in memory include the decrypted portion(s) of application 113, based on one or more application files, header files, environment variables, and/or any other standard and/or proprietary data structure that indicates which segment(s) in memory include the decrypted portion(s) of application 113. Specialized testing logic 115 may merge the originally encrypted portion(s) of application 113 with the originally unencrypted portion(s) of application 113, if any.

The unencrypted version of application 113 may be formatted for human readability and/or stored in application and metadata store 160. The unencrypted version of application 113 may include one or more constants, characters, strings, and/or other data and/or data structures in the unencrypted version of application 113.

4.4.2 Storing the Unencrypted Version of the Application

Specialized testing logic 115 may dump a decrypted version of application 113 to memory include in, and/or coupled to, embedded device 110. For example, specialized testing logic 115 may store the decrypted version of the application in one or more filed in memory coupled to embedded device 110.

Specialized testing logic 115 may send a notification to test control logic 135 indicating where the unencrypted version of application 113 is stored. Additionally or alternatively, specialized testing logic 115 may send the unencrypted version of application 113 to test control logic 135. Additionally or alternatively, test control logic 135 and/or specialized testing logic 115 may store the unencrypted version of application 113 in application and metadata store 160.

4.4.3 Generating and Storing Disassembly

In step 320, the control computer generates a disassembled version of the unencrypted application. For example, test control logic 135 may invoke a disassembler to generate assembly code based on the unencrypted version of application 113. The resulting assembly code, which may also be referred to as disassembly, may be formatted for human readability and/or stored in application and metadata store 160. The disassembly may include one or more constants, characters, strings, and/or other data and/or data structures in the unencrypted version of application 113.

4.4.4 Extracting Descriptions of Objects and Interfaces

In step 330, the control computer extracts a description of one or more objects and/or interfaces defined in the unencrypted version of the application. For example, some compiled applications include metadata. Metadata may include, among other things, one or more interfaces, instance variables, method declarations, method type identifiers, return type identifiers, method signatures, keywords, parameter types, and/or parameter names for one or more objects, classes, modules, interfaces, headers, and/or any other type of data and/or data structure defined in the application. Test control logic 135 may extract, and/or invoke another application to extract, metadata from application 113 and store the extracted metadata in application and metadata store 160.

4.4.5 Sending the Unencrypted Application, Disassembly, and Metadata to a Consultant In step 340, the control computer sends the metadata and the disassembled version of the application to one or more devices associated with one or more consultants. For example, test control logic 135 may notify a consult using consultant computer 165 that the unencrypted version of application 113 and corresponding disassembly and metadata are stored in application and metadata store 160. The consultant, through consultant computer 165, may retrieve the unencrypted version of application 113 and corresponding disassembly and metadata from the application and metadata store 160. Additionally or alternatively, test control logic 135 may send the unencrypted version of application 113 and corresponding disassembly and metadata to consultant computer 165.

A consultant using consultant computer 165 may review the unencrypted version of application 113 and corresponding disassembly and metadata to find and/or verify one or more vulnerabilities and/or errors. The consultant may store data in application and metadata store 160, through consultant computer 165, indicating and/or describing one or more vulnerabilities and/or errors that were found and/or verified.

4.5 Testing for Vulnerabilities

Returning now to step 250, the control computer may test for vulnerabilities and errors in the application. For example, test control logic 135 may test for vulnerabilities and/or errors when users input data, by simulating one or more users selecting, and/or entering data into, one or more user interface ("UI") elements.

Simulating a user selecting, and/or entering data into, a UI element may be done many ways. For purposes of illustrating a clear example, assume application 113 is being executed by embedded device 110, a UI element in application 113 is a field that is populated with text as a user selects characters from a keyboard, the UI element corresponds to an instance of an object in memory allocated to application 113, and the object supports a particular input method that programmatically populates the UI element and/or the state of the object with text. As discussed in detail herein, an embedded device, such as embedded device 110, and/or the underlying operating system, may prevent applications and/or processes other than application 113 from accessing memory allocated to application 113 and/or calling a method defined by application 113.

To simulate a user entering data into the UI element, and/or selecting a UI element, one or more methods can be injected into application 113 at run-time, which call an input and/or selection method defined in application 113. For example, specialized testing logic 115 may include one or more methods that call one or more methods in application 113, which simulate a user selecting, and/or entering data into, one or more UI elements in application 113.

Figure 4:
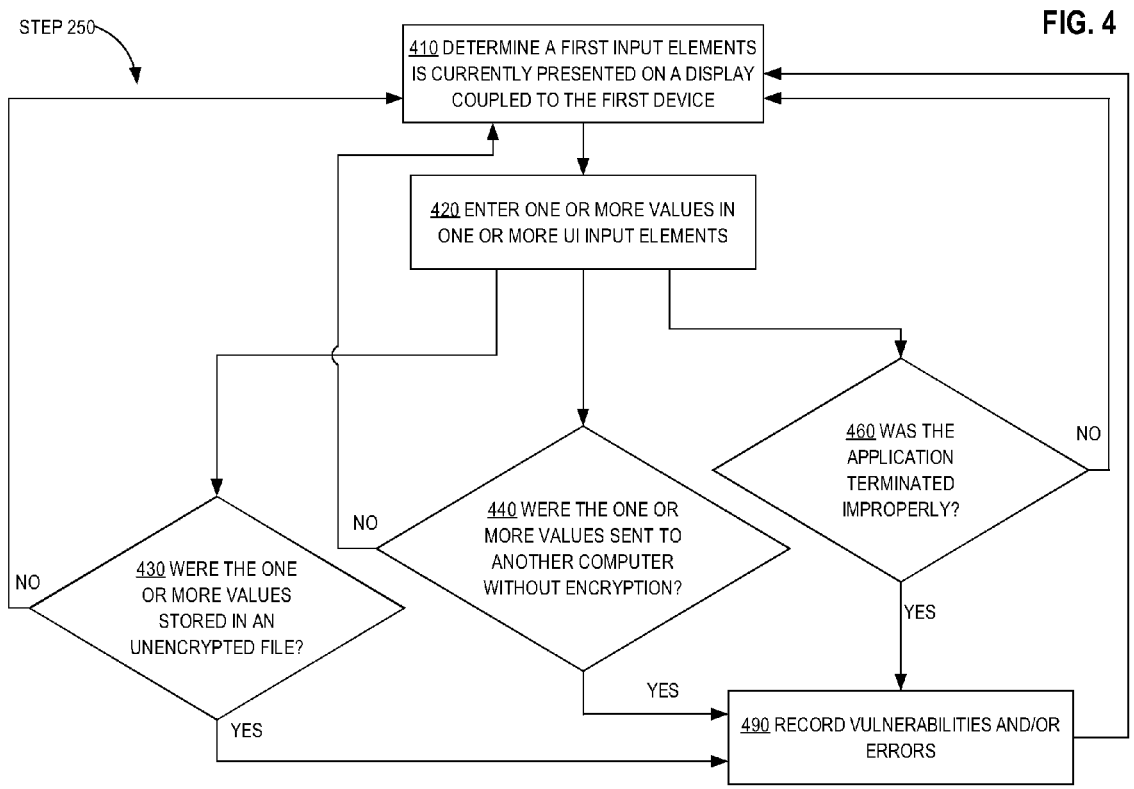
FIG. 4 illustrates a process for testing vulnerabilities and errors in an example embodiment.

FIG. 4 illustrates a process for testing vulnerabilities and errors in an example embodiment. For purposes of illustrating a clear example, assume application 113 is being executed on embedded device 110, specialized testing logic 115 was loaded accordingly and is executing in parallel with application 113, and a first UI element and a second UI elements, which are in a hierarchy of UI elements, are presented on a display coupled to embedded device 110. Test control logic 135 may work in concert with specialized testing logic 115 and request processing logic 185 to detect vulnerabilities and/or errors in application 113. Control computer 130, and/or other computers and/or modules, may repeat the steps discussed herein for one or more input values, one or more UI elements in the hierarchy of UI elements, and/or one or more combination of UI elements in the hierarchy of UI elements and/or input values. If a new hierarchy of UI elements is displayed, then control computer 130, and/or other computers and/or modules, may repeat the steps discussed herein for one or more input values, one or more UI elements in the new hierarchy of UI elements, and/or one or more combination of UI elements in the new hierarchy of UI elements and/or input values.

4.5.1 Selecting a User Interface Element that is Currently Presented

In step 410, the control computer determines a first input element is currently presented on a display coupled to the first device. For example, test control logic 135 may instruct specialized testing logic 115 to select one or more UI input elements that are currently presented on a display coupled to embedded device 110. In response, specialized testing logic 115 may execute a method that causes application 113 to return a hierarchy of in-memory objects that correspond with a hierarchy of UI elements currently presented.

Specialized testing logic 115 may select a first UI element and determine whether the first UI element is a particular type of UI input element based on a name, property, method, and/or any other data and/or data structure associated with the corresponding object. For purposes of illustrating a clear example, assume application 113 supports introspection on instantiated objects. Specialized testing logic 115 may make a call to an introspective method that indicates whether a first object, which corresponds to the first UI element, supports the particular input method that programmatically populates the UI element and/or the state of the object with text. The introspective method may return a value that indicates whether the object supports the particular input method. If the returned value indicates the first object does not support the particular input method, then specialized testing logic 115 may move on to a second object that corresponds with a second UI element in the hierarchy, and so on, until specialized testing logic 115 finds an object that corresponds with a particular type of UI input element.

Additionally or alternatively, specialized testing logic 115 may continue to make introspective calls until specialized testing logic 115 determines what type of UI element the first object corresponds to. For example, if the first returned value indicates that the first object does not support a first particular input method, then specialized testing logic 115 may call an introspective method that indicates whether the first object supports a second, different input method that programmatically simulates a different user interaction, such as pressing a button.

Specialized testing logic 115 may send test control logic 135 a representation of a hierarchy, and/or a subset of the hierarchy, of objects and/or identifiers that identify each object and/or the type of input each object corresponds to. For purposes of illustrating a clear example, assume that specialized testing logic 115 determined that two objects correspond to UI input elements currently displayed on a display coupled to embedded device 110. The two objects are child objects to a parent object, which corresponds to a parent UI element of the two UI input elements. The first object corresponds to a first UI input element that is a text field. The second object corresponds to a second UI input element that is a button. Specialized testing logic 115 may send data to test control logic 135 defining three identifiers: the first identifier may identify the first object, the second identifier may identify the second object, and the third identifier may identify the parent object to the first object and the second object. The parent UI element may, but need not, be currently displayed on a display coupled to embedded device 110.

4.5.2 Simulating One or More User Inputs by Entering One or More Values in One or More UI Input Elements In step 420, the control computer enters one or more values in one or more UI input elements. For example, test control logic 135 may send specialized testing logic 115 data indicating a particular value to be entered into the first UI element, which is a text field in this example, and that the second UI element, which in this example is a button, should be selected shortly thereafter. In response, specialized testing logic 115 may enter the particular value in the first UI element via a first input method that programmatically populates the first object and/or the first UI element with the text. Specialized testing logic 115 may select the second UI element via the input method that programmatically selects the second UI element as if the second UI element was selected by a user.

4.5.3 Detecting One or More Vulnerabilities and/or Errors

Test control logic 135, specialized testing logic 115, and/or request processing logic 185 may detect one or more vulnerabilities and/or errors based on the simulated inputs. The following are examples of detecting vulnerabilities and/or errors in application 113. For purposes of illustrating a clear example, FIG. 4 shows three vulnerabilities and/or errors that may be detected. Additional vulnerabilities and/or errors are also discussed below. However, one or more additional vulnerabilities not illustrated in FIG. 4 and/or discussed below may also be detected by test control logic 135, specialized testing logic 115, and/or request processing logic 185. While the following examples are presented sequentially, each of vulnerabilities and/or errors may be detected serially and/or in parallel.

4.5.3.1 Detecting Unencrypted User Input Stored in One or More Files

In step 430, the test control computer determines whether the one or more values were stored in an unencrypted file. For purposes of illustrating a clear example, assume test control logic 135 has registered a callback through the remote command-line interface with the underlying operating system on embedded device 110, which notifies test control logic 135 when a file is created and/or updated. If test control logic 135 receives a callback indicating that a first file was created and/or updated, then test control logic 135 may check the file to determine whether the particular value entered into the first UI element was stored in plain text. If so, then test control logic 135 may pass to step 490. Otherwise, control may pass to step 410 and/or wait for one or more other tests to be performed as discussed herein.

In step 490, the control computer records the vulnerabilities and/or errors. For example, test control logic 135 may store a record, flag, and/or data in application and metadata store 160 associated with application 113 indicating that application 113 is storing potentially private and/or sensitive information entered by the user into the first UI element in memory and/or storage without encrypting and/or otherwise protecting the information. Control may return to step 410 and/or repeat one or more of the methods discussed herein.

4.5.3.2 Detecting User Input in Unencrypted Communication

In step 440, the test control computer determines whether the one or more values were sent to another computer without encryption. If the one or more values are detected, then control may pass to step 490. Otherwise, control may pass to step 410 and/or wait for one or more other tests to be performed as discussed herein. For purposes of illustrating a clear example, assume the facts in the example discussed in step 420, and that specialized testing logic 115 registers a protocol handler with the underlying operating system on embedded device 110, which causes each request sent over one or more protocols, such as HTTP and/or HTTPS, to be sent to the protocol handler. The protocol handler may specify which protocol(s) the protocol handler should receive. If specialized testing logic 115 intercepts a request through the registered protocol handler, then specialized testing logic 115 may search the request for the particular value entered into the first UI element.

Additionally or alternatively, embedded device 110 may be configured to send one or more requests over one or more protocols to testing proxy server computer 180. Accordingly, request processing logic 185 may intercept one or more requests sent by application 113. If request processing logic 185 intercepts a request over the one or more protocols, then request processing logic 185 may search the request for a particular value entered into a first UI element. Request processing logic 185 may have received the particular value to search for from test control logic 135 and/or specialized testing logic 115.

If specialized testing logic 115 and/or request processing logic 185 find the particular value, then specialized testing logic 115 and/or request processing logic 185 may notify test control logic 135. Furthermore, control may pass to step 490. For example, test control logic 135, specialized testing logic 115, and/or request processing logic 185 may store a record, flag, and/or data in application in application and metadata store 160 associated with application 113 indicating that application 113 is sending potentially private and/or sensitive information entered by the user into the first UI element to one or more remote computers over one or more networks without encrypting and/or otherwise protecting the information.

4.5.3.3 Detecting Early Termination of the Application

In step 460, the test control computer determines whether the application was terminated improperly. If the test control computer determines the application was terminated improperly, then control may pass to step 490. Otherwise, control may pass to step 410 and/or wait for one or more other tests to be performed as discussed herein. For purposes of illustrating a clear example, assume specialized testing logic 115 comprises a destructor that is executed if application 113 is terminated properly, and the destructor notifies test control logic 135 that application 113 is being terminated properly. If test control logic 135 determines that application 113 was terminated, but did not receive a notification from specialized testing logic 115 indicating that application 113 was terminating, then control may pass to step 490. Test control logic 135 may cause embedded device 110 to re-launch application 113 and continue to detect vulnerabilities and/or errors.

In step 490, the control computer may store the error. For example, test control logic 135 may store a record, flag, and/or data in application and metadata store 160 indicating that application 113 was improperly terminated. Test control logic 135 may include data indicating one or more UI input elements had been selected and/or had been populated with data.

4.5.3.4 Detecting a Mixed Content Vulnerability

A mixed content vulnerability may arise when a client requests data from a secure source and an unsecure source. For purposes of illustrating a clear example, assume application 113 requests sensitive data for a user using embedded device 110 from a bank over of a secure protocol, and application 113 requests JavaScript instructions over an unsecure protocol. The requested JavaScript instructions may format the sensitive data in a particular way to be presented on a display coupled to embedded device 110. However, since the JavaScript instructions are received over an unsecure protocol, an attacker may substitute the requested JavaScript instructions with a new set of JavaScript instructions. The new set of JavaScript instructions may perform the same methods as the originally requested set of JavaScript. Additionally or alternatively, the new JavaScript instructions may cause application 113 to send the sensitive data to the attacker's server and/or database.

The test control computer may detect mixed content vulnerabilities. For purposes of illustrating a clear example, assume specialized testing logic 115 registers a protocol handler with the underlying operating system on embedded device 110, which causes each request over one or more protocols, such as HTTP and/or HTTPS, to be sent to the protocol handler. If the protocol handler receives one or more requests over HTTPS and one or more requests over HTTP, then specialized testing logic 115 may determine that the application 113 has a mixed content vulnerability. Additionally or alternatively, if the protocol handler receives a request for data over HTTPS and a request for instructions, such as JavaScript instructions, over HTTP, then specialized testing logic 115 may determine that application 113 has a mixed content vulnerability. Additionally or alternatively, if the protocol handler receives a request over HTTPS and a request over HTTP within a particular amount of time, then specialized testing logic 115 may determine that application 113 has a mixed content vulnerability.

Additionally or alternatively, if request processing logic 185 receives one or more requests over HTTPS and one or more requests over HTTP, then request processing logic 185 may determine that the application 113 has a mixed content vulnerability. Additionally or alternatively, if request processing logic 185 receives a request for data over HTTPS and a request for instructions, such as JavaScript instructions, over HTTP, then request processing logic 185 may determine that application 113 has a mixed content vulnerability. Additionally or alternatively, if request processing logic 185 receives a request over HTTPS and a request over HTTP within a particular amount of time, then request processing logic 185 may determine that application 113 has a mixed content vulnerability.

If specialized testing logic 115 and/or request processing logic 185 determine application 113 may have a mixed content vulnerability, then specialized testing logic 115 and/or request processing logic 185 may notify test control logic 135. Test control logic 135, specialized testing logic 115, and/or request processing logic 185 may store a record, flag, and/or data in application and metadata store 160 associated with application 113, indicating that application 113 has a mixed content vulnerability.

4.5.3.5 Detecting False Certificates

The control computer may determine whether the application accepts false certificates and/or certificates signed by an untrusted source. For example, request processing logic 185 may intercept a request for a signed secure sockets layer ("SSL") certificate from a particular website and/or server computer from application 113. In response, request processing logic 185 may send application 113 false SSL certificate that is different than the SSL certificate that would have been sent by the website and/or server computer. The false SSL certificate may be signed by an untrusted source. If request processing logic 185 intercepts requests based on the false SSL certificate from application 113 and/or application 113 does not raise an error or terminate processing, then control may pass to step 490. In step 490, request processing logic 185 and or test control logic 135 may store a record, flag, and/or data in application and metadata store 160 associated with application 113, indicating that application 113 may accept false certificates from one or more websites and/or server computers.

In an embodiment, an embedded device, and/or the underlying operating system, may perform SSL pinning. SSL pinning may force an application to accept certificates that are signed from a trusted source. If the embedded device, and/or the underlying operating system, is configured to perform SSL pinning, then, test control logic 135, specialized testing logic 115, and/or a person may disable SSL pinning, programmatically, through a remote command-line interface, through a settings application or control panel, and/or any other method.

4.5.3.6 Checking for Values in the Unencrypted Application

The control computer may check for values in the unencrypted application. For example, test control logic 135 may review the unencrypted application for one or more possible vulnerabilities and/or errors, such as one or more unencrypted strings, data, and/or data structures that may identify URLs, APIs, credentials, and/or any other private and/or protected method, storage, and/or service. Test control logic 135 may store each of the vulnerabilities found in application and metadata store 160. Test control logic 135 may associate each of the vulnerabilities that are related to application 113 and stored in application and metadata store 160 with application 113.

4.5.3.7 Supplementing Records of Vulnerabilities and/or Errors

A control computer, embedded device, and/or testing proxy server computer may store supplemental data indicating what may have caused an error or how the vulnerability was detected. Supplemental data may include one or more values entered into one or UI input elements, screen captures, and/or any other data useful to identify, verify, and/or reproduce a detected vulnerability and/or error.

Test control logic 135 and/or specialized testing logic 115 may take one or more screen captures of the UI currently displayed on embedded device 110. Test control logic 135 and/or specialized testing logic 115 may store the screen capture(s) in storage and/or memory communicatively coupled to embedded device 110. Test control logic 135 and/or specialized testing logic 115 may store the screen capture(s) directly, and/or through one or more computers and/or modules, in application and metadata store 160. Test control logic 135 may request and/or received one or more screen shots and/or other data from specialized testing logic 115.

When control passes to step 490, test control logic 135 may associate the supplemental data with application 113. Additionally or alternatively, test control logic 135 may associate the supplemental data with one or more detected vulnerability and/or errors.

4.5.3.8 Validating Vulnerabilities and/or Errors

One or more of the vulnerabilities and/or error detected may be verified by one or more consultants. For example, a consultant may query application and metadata store 160 for one or more of the vulnerabilities and/or errors, and corresponding supplemental information stored in application and metadata store 160. The consultant may review and/or reproduce the vulnerability and/or error. If the vulnerability and/or error was confirmed and/or reproduced, then the consultant, through consultant computer 165, may store data associated with the vulnerability and/or error in application and metadata store 160 indicating the vulnerability and/or error was confirmed and/or reproduced. Additionally or alternatively, if the vulnerability and/or error could not be confirmed and/or reproduced, then the consultant, through consultant computer 165, may store data associated with the vulnerability and/or error in application and metadata store 160 indicating the vulnerability and/or error could not be confirmed and/or reproduced.

4.6 Testing Multiple Applications and/or Versions

Returning to FIG. 2 in step 260, the control computer may determine whether a new version of the application is available. For example, test control logic 135 may poll application host server computer 140 for a newer version of application 113 using one or more of the methods discussed herein. If a newer version is available, then control may pass to step 210 and repeat one or more of the methods discussed above. Otherwise, control passes to step 370. In step 270, the control computer waits for a predefined amount of time and/or to be instructed to determine if a newer version of the application is available. For example, test control logic 135 may store an entry in application and metadata store 160 indicating when test control logic 135 should determine if a new version of application 113 is released. Thus, test control logic 135 may periodically poll application host server computer 140 for new versions of application 113. However, test control logic 136 need not wait to test other specialized applications and/or to determine whether newer versions of other applications are available.

In the examples discussed herein, a control computer tested a specialized application on an embedded device. However, the control computer may perform one or more of the methods discussed above on one or more other embedded devices, such as embedded device 120.

The control computer may perform one or more of the methods discussed above in parallel using different embedded devices. For example, test control logic 135 may work in concert with specialized testing logic 115, specialized testing logic 125, and request processing logic 185 to test application 113 and application 123 in parallel. Application 113 and application 123 may, but need not, be different specialized versions of the same application and/or project. Application 113 may be created by a different developer than application 123. Application 113 may be released, downloaded, and/or tested asynchronously.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
    a mobile device comprising a first memory, a first processor coupled to the first memory,
    a first processing logic coupled to the first memory and the first processor;
        a second computing device comprising a second memory, a second processor coupled to the second memory, a second processing logic coupled to the second memory and the second processor, and configured to:
    download an application program to the first memory, wherein the application program comprises an encrypted portion that is based on a set of personally identifying data stored in the first memory;
    after the download, to configure the application program to load the first processing logic when the application program is executed, wherein the first processing logic is configured to store an unencrypted version of the application program on the first memory while the application program is being executed;
    after the download, load and store, to cause the mobile device to execute the application program;
    after the download, load, store and execute, to cause the first processing logic to test the application program for vulnerabilities and errors;
    wherein the mobile device has a first architecture, the second device has a second architecture that is different than the first architecture, and the application program is compiled for a device with the first architecture;
    wherein the second processing logic is configured to, as part of downloading the application program:
    store the application program on the second memory;
    copy the application program from the second memory to the first memory.

2. The computer system of claim 1, wherein the second processing logic is configured to:
    extract a description of one or more objects defined in the unencrypted version of the application program;
    generate a disassembled version of the unencrypted version of the application program.

3. The computer system of claim 2, wherein the second processing logic is configured to send the description of the one or more objects and the disassembled version of the application program to one or more devices associated with one or more consultants.

4. The computer system of claim 1, further comprising, using the second computing device, testing the application program for vulnerabilities and errors.

5. A method comprising:

in computer system comprising a mobile device having a first memory, a first processor coupled to the first memory, a first processing logic coupled to the first memory and the first processor, and a second device comprising a second memory, a second processor coupled to the second memory, a second processing logic coupled to the second memory and the second processor: using the second device, downloading an application program to a first storage coupled to the mobile device, wherein the application program comprises an encrypted portion based on a set of personally identifying data stored on the first storage;

using the second device, after the downloading, configuring the application program to load and execute a pre-compiled library when the application program is launched and which when executed by the mobile device, causes storing an unencrypted version of the application program on the first storage;

using the second device, after the downloading and storing, launching the application program;

using the second device, after the downloading, storing and launching, testing the application program for vulnerabilities and errors;

wherein the application program is compiled for the mobile device with a first architecture, and wherein:

downloading the application program comprises:

using the second device, storing the application program on a second storage coupled with the second device with a second architecture, wherein the first architecture and the second architecture are different;

using the second device, copying the application program from the second storage to the first storage.

6. The method of claim 5 comprising:

extracting a description of one or more objects defined in the unencrypted version of the application program;

generating a disassembled version of the unencrypted version of the application program.

7. The method of claim 6 comprising sending the description of the one or more objects and the disassembled version of the application program to one or more devices associated with one or more consultants.

8. The method of claim 5, further comprising, using the second computing device, testing the application program for vulnerabilities and errors.

* * * * *